Figure 1:

J. R. WILLIAMS.
PROCESS OF MAKING STEEL CENTER CALKS.
APPLICATION FILED NOV. 27, 1907.

939,884.

Patented Nov. 9, 1909.
2 SHEETS—SHEET 1.

Witnesses
Jos. F. Collins.
J. M. Wynkoop

Inventor
John R. Williams,
By Knight Bros.
Attorneys

UNITED STATES PATENT OFFICE.

JOHN R. WILLIAMS, OF SCRANTON, PENNSYLVANIA.

PROCESS OF MAKING STEEL-CENTER CALKS.

939,884. Specification of Letters Patent. Patented Nov. 9, 1909.

Application filed November 27, 1907. Serial No. 404,077.

*To all whom it may concern:*

Be it known that I, JOHN R. WILLIAMS, a citizen of the United States, residing at Scranton, in the county of Lackawanna and State of Pennsylvania, have invented certain new and useful Improvements in Processes of Making Steel-Center Calks, of which the following is a specification.

This invention relates to the process of making horse-shoe calks having a steel center so embedded therein as to render the calk self-sharpening in use as is well understood in the art, and particularly to that class of steel center calks in which the hard metal center is inserted in a bore or socket formed axially in the body of the calk and extending a portion of the way therethrough.

In expired Letters Patent No. 246505, granted August 30, 1881 to Hills, it was proposed to insert a hardened steel part of the calk formed with the upper part thickest to produce a wedge shape for retaining said part in place; the body of the calk being made of malleable iron, with an opening to receive the part of steel and being then struck in a die so as to hold the steel in place.

In Letters Patent No. 335395, granted February 2, 1886 upon the invention of Stone, is described a removable horse-shoe calk of round section in which the center is a cylinder held in place by welding the parts together under external pressure.

In U. S. Patent No. 335259, granted February 2, 1886 upon the invention of Warren, is disclosed an improvement on the Stone patent, according to which the inner end of the steel center is enlarged by upsetting due to pressure applied endwise to the center piece, thereby producing the inner enlargement employed by Hills for holding the hard center in place.

It has also been proposed in U. S. Letters Patent No. 779753, granted January 10, 1905 upon the invention of Whitaker, to form the hard steel center piece with an enlargement before introducing it into the body of the calk so as to provide a laterally projecting portion thereon and then after introducing it into the relatively soft metal body, to swage the metal body into holding contact with the pin laterally; the head of the pin being made round so that the metal can be swaged in rear of the projecting portion as well as on the sides.

The object of my invention is to simplify the manufacture of calks of this kind and to produce a better article; that is to say, an article in which there is more intimate contact between the outer body portion and the hard steel center. To these ends I totally avoid any preparation of the pin other than cutting it to length or any separate step for forming the enlargement of the pin, either before inserting it or after it is inserted and I avoid any swaging of the calk in rear of the enlargement; the enlargement on the pin, and the swaging of the body into gripping relation to the pin being accomplished mainly by the same step which shapes the calk, but being supplemented during the act of removing the die from the calk without adding any step or expense to the process. That is to say, I prepare a suitable blank, form a bore therein, drop a straight cylindrical steel pin into the bore and then force a die down over the blank, of such shape that it will contract the body portion upon the pin, reduce the intermediate portion of the pin slightly, to leave an enlargement below, and by securely gripping the pin through the body portion, during continued downward movement, will move the upper portion of the pin and body, downward, together, upsetting the lower portion of the pin so as to enlarge it to fill the bore, and at the same time compress the outer walls laterally; and then finally as the die draws off the blank, the work is stretched longitudinally with the effect of further contracting the body portion upon the center piece. The stretching effect is produced by so forming the die that the upper end of the blank will spread into an enlargement therein so that when the die draws off, the resistance of the metal to the compression necessary to strip the die, will impart sufficient longitudinal pull to the body of the calk to stretch it slightly and therefore contract it on the center piece.

The calk produced according to this method is superior to a calk wherein the enlargement is previously formed and the body portion is pressed radially inward to the center piece, because with my improved process of making the calk, the act of forming of enlargement on the pin and the compressing of the body simultaneously, brings the parts into more intimate contact; moreover, when the stretching takes place in the body portion, the outer portion is left under strains of tension due to the resistance of the core or pin to the contraction which seeks to take place as a consequence of the longitudinal stretching.

Figure 2:
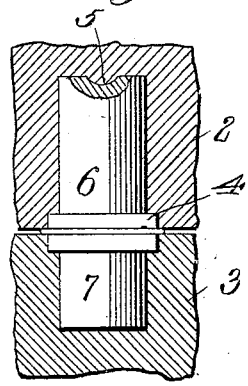
Figure 3:
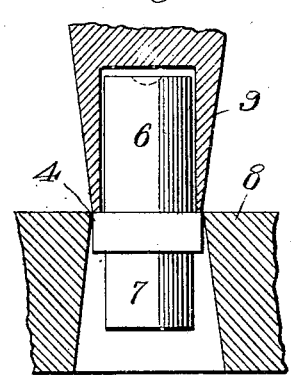
Figure 4:
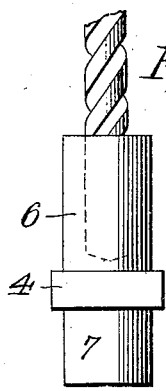
Figure 5:
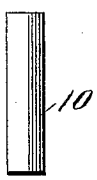
Figure 6:
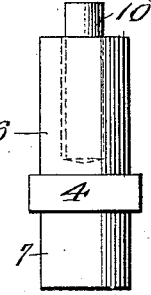
Figure 7:
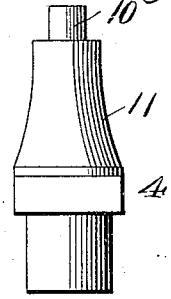
Figure 8:
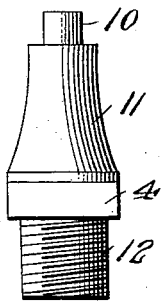
Figure 9:
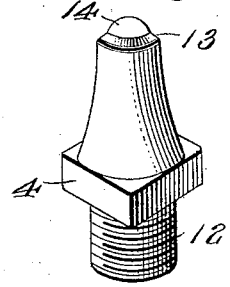
Figure 10:
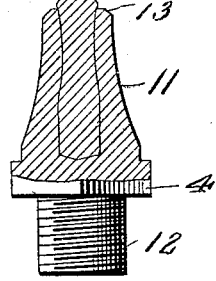
Figure 11:
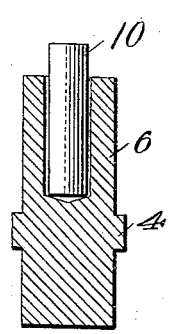
Figure 12:
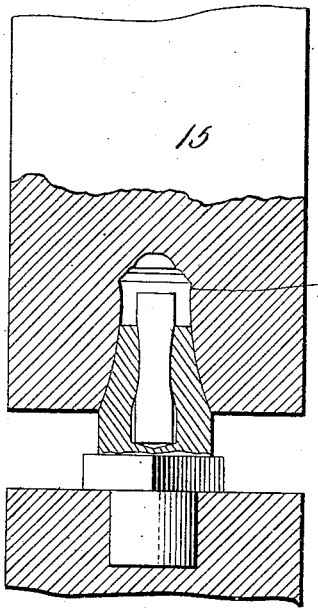
Figure 13:
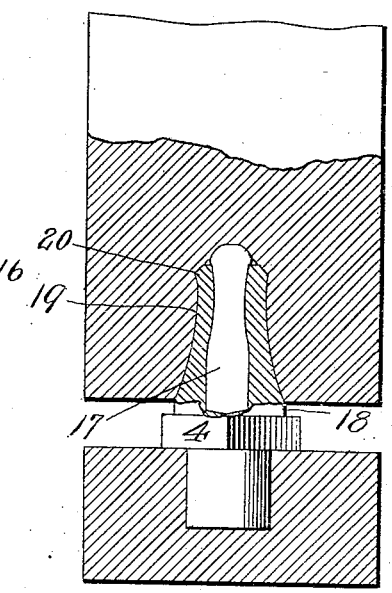
Figure 14:
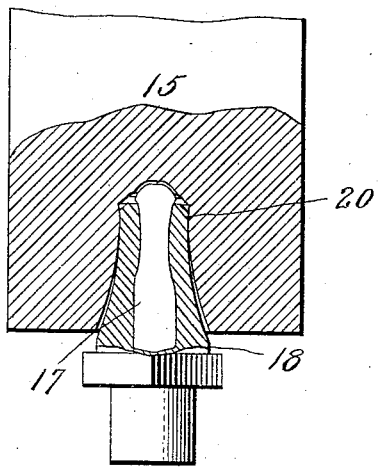
Figure 15:
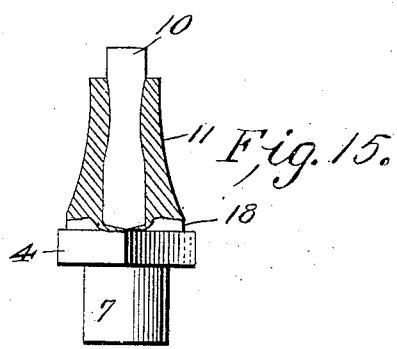

My invention will be fully understood upon reference to the accompanying drawings in which, Figure 1 represents a length of material from which the blank of my improved calk is produced; Fig. 2 represents the material compressed endwise between dies to form the shoulder on the calk and to center-punch the blank; Fig. 3 represents a step by which the fin is trimmed from the shoulder of the blank; Fig. 4 represents the preferred method of providing the bore or socket in the blank; Fig. 5 is a view of the hard steel center pin in the form in which it is introduced into the bore of the blank; Fig. 6 represents the center pin and blank assembled; Fig. 7 represents the calk after the pressing operation is completed; Fig. 8 represents the calk shown in Fig. 7 after the thread has been applied thereto; Fig. 9 is a perspective view of the finished calk; Fig. 10 is a sectional view of the finished calk; Figs. 11 to 15 are designed to show more clearly the steps incident to setting the pin in the calk; Fig. 11 being a sectional view of the blank with the pin inserted; Fig. 12 being a view showing the first portion of the operation of the die in compressing the upper portion of the blank upon the pin, reducing the pin slightly, and developing the grip (the reduction in the pin facilitating the grip) by which the pin is pressed downward and upset upon its end; Fig. 13 being a sectional view showing a completion of the downward movement of the die; Fig. 14 being a sectional view illustrating the stripping action of the die in which the die has separated from the work throughout the greater portion of its surface but is still in gripping relation with the upper end; Fig. 15 being a section of the calk in which the die work is completed, but finishing omitted.

1 represents a section of a cylindrical piece of stock from which the blank of the calk is to be made. This piece is pressed between dies 2 and 3 which receive the material without compressing it radially, and confine it against expansion, except near the meeting faces of the die where they are formed to permit the metal to expand to provide the shoulder 4; the upper die being provided with an upper boss 5 for the purpose of center-punching the blank as a preliminary to drilling. The blank 6 is thus produced. This blank will ordinarily be left with a fin 7, to remove which I prefer to force the blank through the trimming die 8, any suitable forcing member such as 9 being used to force the blank through. The blank 6 is next drilled, as suggested by Fig. 4 (a number of them being drilled at once in a gang-drill) to provide a bore of suitable size to freely admit the center pin 10 (Fig. 5) which is of cylindrical form, with straight sides. Pin 10 is then dropped into the bore as shown in Fig. 6 and the assembled parts are then jointly compressed to the shape shown in Fig. 8 where we have the tapered calk 11 with the protruding but firmly embedded pin 10. The lower end of the calk is then threaded to provide the attaching shank 12. The upper end is then preferably finished to provide the bevel 13 and the projecting end 14, (Fig. 10) but may be left as in Fig. 15.

The process of setting down or compressing the body of the calk to firmly embed the center pin would be understood more clearly upon reference to Figs. 11 to 15. In Fig. 11 it will be seen that the pin fits loosely within the bore, resting on the bottom of the bore with a flat or square end. The compressing die 15 has its cavity made of peculiar shape, having not only a flaring lower portion corresponding approximately to the external form of the finished calk, but also the upper enlargement 16 as shown. The first effect of the die 15 is to compress the upper portion of the blank as shown in Fig. 12 and also the intermediate portion of the center pin, sufficiently to produce a grip upon the pin. Further downward movement of the die 15, while accompanied by sliding over the calk body nevertheless causes some downward movement to the metal of the calk, and through it to the pin, which, though slight, is sufficient to upset the lower end of the pin in the bore. While the pin is pressed snugly down into the bottom of the drill bore, the enlargement is essentially cylindrical. The compressing action of the die does not compress the body of the calk below the lower end of the pin for I find it advantageous to leave a portion 18 of the original cylindrical surface just above the shoulder as this facilitates the working of the die; the snug fit at the lower end being obtained by the downward pressure of the pin. The angle of the sides 19 of the die should be selected with care so that while the wedging action causes a sufficient grip to upset the end 17, yet the movement of the pin under this gripping effect is very much less than the movement of the die. By having the cavity enlarged slightly as indicated at 16, the upper end 20 of the calk expands into this cavity as the die reaches its lower limit, and thus forms an interlock between the die and the calk so that when the die is stripped off, its narrow portion or neck will be compelled to compress the enlargement and this will produce a longitudinal stretching of the calk.

The longitudinal stretching just described is very desirable for the reason that it has the effect of drawing out or displacing any air or gases that may have become trapped in the bore, the stretching causing a reduction in diameter of the body of the calk, which reduction begins with the thicker portion and proceeds upwardly as the die draws off, thus favoring the escape of any trapped air or gas. Inasmuch as the center pin resists this contraction of the body portion, after the walls are in contact, it follows that the stretching effect produces a much more intimate connection between the parts. The first step in stripping the die is illustrated in Fig. 15 where the sides of the cavity are separated from the calk throughout a greater portion of its surface, but the grip at the upper end is still maintained.

The calk produced by my new process is a better calk than that produced by the processes heretofore known for the reason that both the expansion of the pin within the bore and the longitudinal stretching of the body and consequent contraction upon the pin produces a calk in which the outer member is under strains of tension and the inner member under strains of compression; hence the intimacy of contact is insured throughout the life of the calk, and there is less apt to be separation as a result of shock and vibration.

The end of the calk may be finished by constructing the die as shown, so that it will press the end in the shape shown in Fig. 10, and assist in expanding the end into the enlargement which gives the pull when the die is stripped, or such shape may be given to the end of the die by pressing the calk into the shape shown in Fig. 15 and thereafter finishing it in a milling machine. Or the calk may be sold in the shape shown in Fig. 15, though this is undesirable, owing to the likelihood of its injuring the hand of the horseshoer.

Having thus described the invention, the following is what I claim as new therein and desire to secure by Letters Patent:—

1. An improvement in the art of producing steel center calks which consists in introducing the center part within the calk and then compressing the body of the calk upon the center part and simultaneously causing a change in diameter of the center part, and leaving a relatively enlarged lower portion.

2. An improvement in the art of producing steel center calks which consists in introducing a pin of substantially uniform diameter into the bore in the body of the calk, then forcing a die upon the calk, compressing the upper end of the body upon the upper portion of the pin, changing thereby the relative diameters of the upper and lower portions of the pin, and tapering the calk.

3. The art of producing steel center horseshoe calks which consists in providing a blank with central bore, introducing a steel pin into the bore and then setting the blank down by a die, to compress the blank inward upon the upper portion of the pin and thereby gripping the pin, forcing the pin downward and upsetting its portion below the grip to enlarge the same and tapering the blank.

4. The art of producing steel center horseshoe calks which consists in providing a blank with central bore, introducing a steel pin into the bore and then setting the blank down by a die, to compress the blank inward upon the upper portion of the pin and thereby gripping the pin, through the medium of the compressed body portion and forcing the upper portion of the pin downward relatively to the lower portion to enlarge the latter, the downward movement of the die being arrested above the lower end of the pin.

5. The process of manufacturing steel center calks which consists in pressing the calk about the steel pin and then stretching the calk endwise to contract it into intimate relation with the pin.

6. The art of forming steel center calks which consists in introducing a straight pin within the calk, gripping the pin through the calk, forcing the pin and calk endwise together until the pin is upset and then stretching the body of the calk endwise to further tighten it upon the pin.

7. An improvement in the art of manufacturing steel center calks, which consists in introducing a steel pin within the calk, and then pressing the calk in a suitable die, until the body of the calk is pressed about the pin and its upper end expanded, then drawing the die off the calk, and causing a restricted portion of the die to draw over the end of the calk, thereby stretching the calk and firmly closing its end around the pin.

8. The improvement in the art of manufacturing steel center calks which consists in providing a blank with a bore, introducing a straight cylindrical pin within the bore, compressing the blank upon the pin by a suitable die to grip the same, and upset its lower portion, and firmly seating the pin by additional pressure upon the end thereof.

The foregoing specification signed at Scranton, Pa., this eighth day of July, 1907.

JOHN R. WILLIAMS.

In presence of two witnesses—
VICTOR E. WENZEL,
LOUIS LA FONTAINE.